R. BORNBROOK.
Car Truck.

No. 27,982.

Patented Apr. 24, 1860.

UNITED STATES PATENT OFFICE.

RICHARD HORNBROOK, OF CINCINNATI, OHIO.

RUNNING-GEAR OF RAILROAD-CARS.

Specification of Letters Patent No. 27,982, dated April 24, 1860.

*To all whom it may concern:*

Be it known that I, RICHARD HORNBROOK, of Cincinnati, Hamilton county, Ohio, have invented a certain new and useful Improvement in Running-Gear of Railroad-Cars; and I hereby declare the following to be a full, clear, and exact description of the same, reference being had to the accompanying drawings, making part of this specification.

My invention relates to an arrangement of supplementary wheels with broad flangeless tires and adapted when occasion requires it to temporarily relieve the ordinary gear from its support of the car either on one or both sides, the invention being particularly designed for returning cars to the track after their displacement therefrom.

Figure 1:
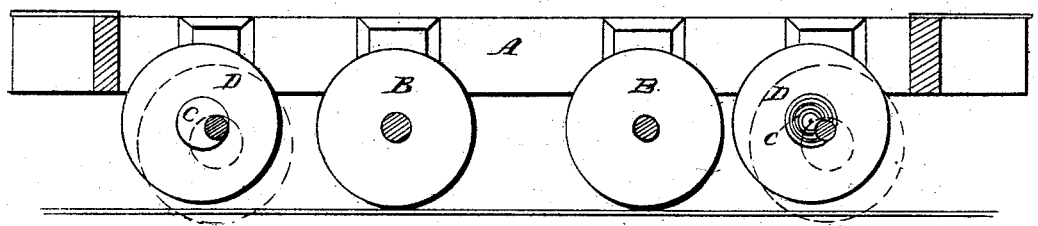
Figure 2:
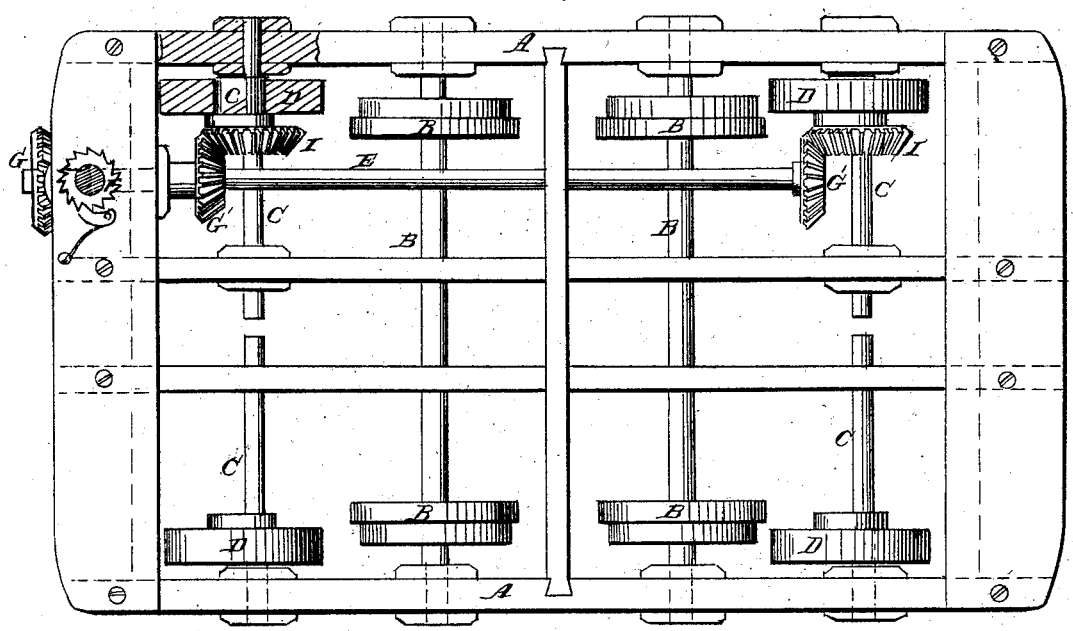

In the accompanying drawings Figure 1, is a longitudinal section of a bed and running gear with my improvement. Fig. 2 is a top view thereof.

A is the bed.

B represents the customary running gear.

C are supplementary axles having eccentric journals $c$, carrying supplementary wheels D.

E is a counter shaft capable of being rotated by means of a capstan F and suitable geared connection G.

Bevel wheels G' on the counter shaft E engage in similar wheels I on the axles C so that by rotating the capstan the axles C are turned until by the eccentricity of their journals the side of the car is elevated upon the supplementary wheels an action which may be assisted by the onward movement of the car itself.

A similar capstan and counter shaft may be employed on each side.

I claim as new and of my invention herein and desire to secure by Letters Patent—

The supplementary axles C and eccentric wheels D arranged and combined with the running gear of a rail road car substantially as and for the purpose set forth.

In testimony of which invention, I hereunto set my hand.

RICHARD HORNBROOK.

Witnesses:
OCTAVIUS KNIGHT,
FRANCIS MILLWARD.